United States Patent

[11] 3,555,299

[72] Inventor John David Millward Orpington, England
[21] Appl. No. 695,092
[22] Filed Jan. 2, 1968
[45] Patented Jan. 12, 1971
[73] Assignee THE RANK ORGANIZATION LIMITED London, England
[32] Priority Jan. 18, 1967
[33] Great Britain
[31] No. 2616/67

[54] COMBINED VIDEO SIGNAL LIMITER

7 Claims, 1 Drawing Fig.

[52] U.S. Cl. ........ 307/235, 178/7.1, 307/237, 328/169
[51] Int. Cl. ........ H03k 5/08
[50] Field of Search ........ 307/237, 235, 300; 328/169, 171; 178/7.1DC

[56] References Cited

UNITED STATES PATENTS 2,775,714 12/1956 Curtis ........ 307/317
3,373,366 3/1968 Schulz ........ 328/169

*Primary Examiner*—Donald D. Forrer
*Assistant Examiner*—David M. Carter
*Attorney*—Griffin, Branigan and Kindress

ABSTRACT: An electrical signal is limited to the range between first and second levels by limiting the signal to a direct current at the first level and limiting the resulting signal relative to a second direct current representing the difference between the first and second levels.

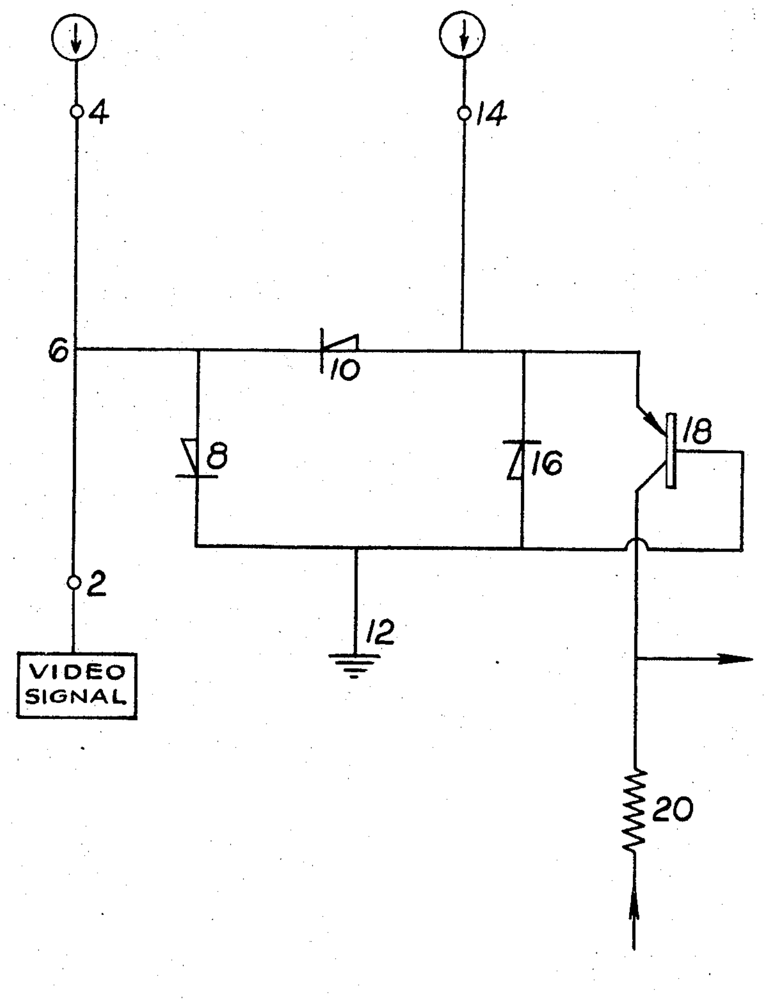
4
14
6
10
8
16
18
2
12
VIDEO SIGNAL
20

COMBINED VIDEO SIGNAL LIMITER

This invention relates to electric signal level limiting circuit arrangements and is particularly concerned with a circuit arrangement for limiting the signal level of a television video signal at an upper and at a lower level, conveniently with respect to the level of blanking pulses in the signal.

In, for example, a television receiving or a television transmitting apparatus, the video signal carrying the vision information, includes a train of recurrent pulses which are related in time to the scanning process of the cathode ray display tube of the apparatus. These pulses, referred to as blanking pulses, are combined with the video signal to produce a composite signal and are utilized in the receiving apparatus to suppress the video signal and/or the scanning signal during the line or frame fly-back periods.

It is an essential requirement in such apparatus for the blanking pulses in such a composite signal to be clean and free of interference, and for the video signal to have an absolute maximum output level with respect to the blanking level. These requirements can be met by adding the blanking pulses to the video signal, to produce the composite signal and limiting this signal between upper and lower levels.

In one hitherto used method of level limiting, the composite video signal is backed off against a known and constant direct current, equivalent to one of the limiting levels, whereby to produce a signal current through a load if and only when the composite signal current is greater or less than the constant current respectively according to whether the signal is being limited at an upper or at a lower level. In such an arrangement, in which partial limiting at a one level only is effected in one limiting circuit, the partially limited signal appears as an output voltage across the load. Since such a limiting principle is current responsive, the signal voltage across this load must be converted into a corresponding current before it can be fully limited at the second level in a second independent limiting circuit.

This method of limiting between two levels requires at least three separate and distinct circuit elements, namely first and second limiting elements together with an intermediate voltage-to-current conversion elements, and it is an object of the present invention to produce an improved video signal limiting circuit, in which limiting is more easily effected.

According to one aspect of the present invention, a circuit arrangement for limiting an electric signal between first and a second levels comprises a first portion for backing this signal against a constant direct current equivalent to the first level, to produce limiting of the signal at the first level, together with a further portion for backing the partly limited signal against a second and constant direct current equivalent to the difference between the first and second levels whereby fully to limit the signal at the second level and thereby between the levels.

Suitably the first signal level is the lower level so that a partly limited signal current will flow in the second portion of the circuit arrangement when the signal current exceeds the first direct current and thereby the first level.

Preferably the completely limited signal emerging from the circuit arrangement is applied to the input of a signal translation device such as a transistor, the output of which applied the fully limited signal to any cooperating circuits.

Conveniently, the circuit arrangement of the invention includes diodes effective to limit voltage transients outside the limiting levels.

An embodiment of the invention will now be particularly described, by way of example, with reference to the accompanying drawing which is a schematic circuit diagram of a television video signal limiting arrangement.

Referring to the drawing, the circuit arrangement comprises a first portion including an input terminal 2, to which a composite video signal including a recurrent train of blanking pulses is applied.

A known and constant first direct current equivalent to the first and lower level at which the composite signal is to be limited, is injected into this first part of the circuit arrangement by way of a further input terminal 4.

The input terminals 2 and 4 meet at a common point 6 which is connected to two diodes 8 and 10. From the point 6, diode 8 is connected in the forward conducting direction, to a constant potential point, which in this embodiment is earth. Diode 10 is connected in the reverse conducting direction to a yet further input terminal 14 into which is injected a constant direct current equivalent to the difference between the upper and lower limiting levels. The input terminal 14 also is connected by way of a diode 16, in the reverse conducting direction, to the earth point 12 and to the emitter of a transistor 18, having its base earthed. The limited video signal is taken from the collector of the transistor 18 which receives operating currents by way of a resistance 20.

In use of the circuit arrangement, assume for example, that the video signal having an amplitude excursion between zero and infinity is to be limited between upper and lower levels respectively of 2 and 5 arbitrary units.

According to the invention, the current injected into input terminal 4 will be two such arbitrary units, and the current injected into input terminal 14 will be 5 units minus 2 units, namely 3 units. Therefore, as the signal current injected into terminal 2 rises from 0 to 2 units, no current will flow through diode 10 during this period so that, during the first 2 unit swing of signal current will flow through diode 8 only. Also during this period the constant current of 3 units, injected into terminal 14, will flow into transistor 18 so producing a constant output level. As the signal current rises to between 2 and 5 units, the current in diode 10 will rise from 0 to 3 units, and, therefore, the output current through transistor 18 will fall from 3 to 0 units. Any further increase in signal current will not appear at the output since transistor 18 cannot take a negative current. Diodes 8 and 16 serve no signal limiting purpose but in practice, without these diodes, large voltage transients would occur when the input signal current crossed the limiting levels resulting in transient voltage spikes at the output due to the finite capacity of diode 10 and transistor 18, when either is reverse biased. Since diodes 8 and 16 are necessary for practical reasons, their presence must not interfere with the circuit operation when an output current is received, their function only being to limit the voltage transients outside the limiting levels.

The advantage of using the transistor 18 instead of a single diode and resistor load as in known limiters is that if a resistive load had been used, the voltage that would have been developed across the load would have tended to put diode 16 into a forward conducting condition, long before its proper time.

By using the transistor 18 instead of a diode the voltage excursion at the junction of diode 16 and transistor 18 can be very much smaller than that across the output load resistor 20.

In practice, further additions to the circuit introduce a blanking signal current into terminal 6, and the constant currents fed into terminals 4 and 14 are adjustable to vary the limiting levels.

I claim:

1. A circuit arrangement for limiting an electrical signal to a range between first and second levels, comprising:
   - a source of first constant direct current representative of the first level;
   - a first circuit portion connected to receive said first direct current and said electrical signal and effective to provide therefrom a current signal representative of the difference of the first direct current and values of said electrical signal on the range side of the first level, thereby limiting said electrical signal to the first level;
   - a source of second constant direct current representative of the difference between the first and second levels; and
   - a further circuit portion connected to receive said second direct current and said signal from the first circuit portion and effective to provide therefrom a current signal representative of the extent to which the output of the first circuit portion is less than said second direct current, thereby providing a representation of said electrical signal that is fully limited to said range at both the first and second levels.

2. A circuit arrangement as claimed in claim 1 in which the said electrical signal is a current signal and the first signal level is the lower level, whereby a partly limited signal current flows in the second circuit portion when the signal current exceeds the first direct current and thereby the first level.

3. A circuit arrangement as claimed in claim 1 including a diode element interconnecting the first circuit portion and the further circuit portion whereby the said signal limited to the first level is applied to the further circuit portion through said diode element.

4. A circuit arrangement as claimed in; claim 1 including an output line and a signal responsive element, the fully limited signal in the further circuit portion being applied to the output line through the signal responsive element.

5. A circuit arrangement as claimed in claim 4 in which said signal responsive element is a transistor.

6. A circuit arrangement as claimed in claim 1, including diodes effective to curtail voltage transients in said circuit portions when the said electrical signal passes outside the limiting levels.

7. A circuit arrangement as claimed in claim 1 in combination with means for applying a television blanking signal constituting said electrical signal to the first circuit portion.